United States Patent [19]

Holweg et al.

[11] 4,275,914
[45] Jun. 30, 1981

[54] SAFETY SUPPORT FOR ADJUSTABLE VEHICLE SEATS

[75] Inventors: Rainer Holweg, Wermelskirchen; Bernd Klüting, Radevormwald, both of Fed. Rep. of Germany

[73] Assignee: Keiper Automobiltechnik GmbH & Co. KG, Remscheid, Fed. Rep. of Germany

[21] Appl. No.: 17,160

[22] Filed: Mar. 2, 1979

[30] Foreign Application Priority Data

Mar. 2, 1978 [DE] Fed. Rep. of Germany ....... 2808884

[51] Int. Cl.³ .............................................. B60N 1/08
[52] U.S. Cl. ................................... 296/65 R; 248/429
[58] Field of Search ............. 248/429, 430; 296/65 R, 296/65 A, 66, 67; 297/216

[56] References Cited

U.S. PATENT DOCUMENTS

| | | | |
|---|---|---|---|
| 2,919,744 | 1/1960 | Tanaka | 296/65 R |
| 2,946,326 | 7/1960 | Bates et al. | 296/65 R |
| 3,897,101 | 7/1975 | Hess | 296/65 A |
| 4,101,110 | 7/1978 | Voss et al. | 248/430 |

*Primary Examiner*—Robert R. Song
*Attorney, Agent, or Firm*—Michael J. Striker

[57] ABSTRACT

An arresting device in a longitudinally adjustable guide rail assembly for motor vehicle seats includes a shaft rotatably supported in a stationary bearing plate and driven by a stationary electromotor; the driving pinion of the electromotor is in mesh with an intermediate gear which is supported for free rotation on the shaft; a coupling disk is supported for joint rotation on the shaft and for an axial displacement between the bearing plate and the face of an intermediate gear. The bearing plate portion opposite the coupling disk is provided with a ring of arresting teeth and also the facing side of the intermediate gear is provided with a corresponding toothing. Both sides of the coupling disk are serrated and normally are urged by a cup spring into engagement with the arresting teeth of the intermediate gear. In the case of a collision when the shaft is rotated by inertial forces acting on the seat, the inclined surfaces of the teeth on the intermediate gear displace axially the coupling disk and bring the same into engagement with the teeth of the arresting ring so that the reduction gears of the driving motor are bypassed and the seat is held in its adjusted position.

5 Claims, 5 Drawing Figures

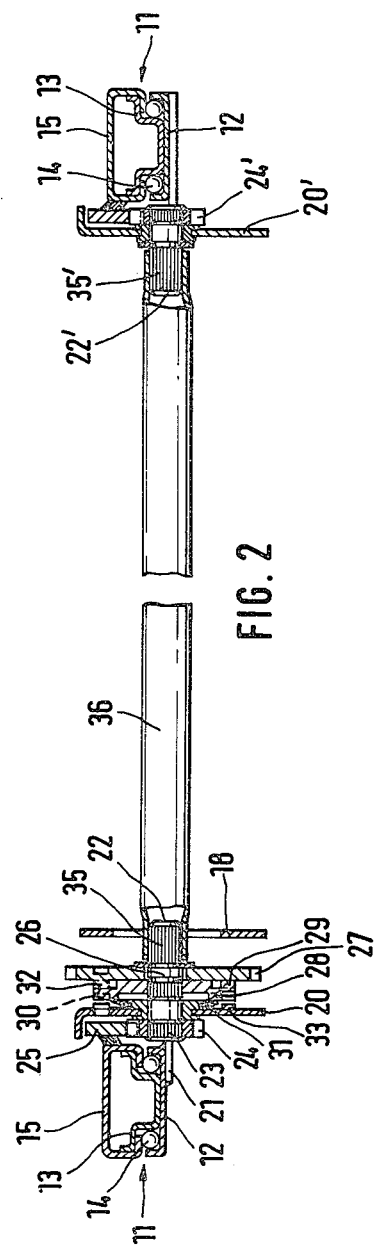
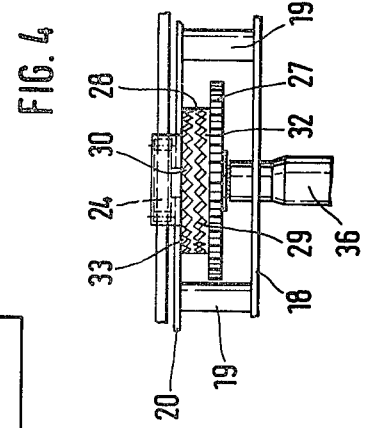
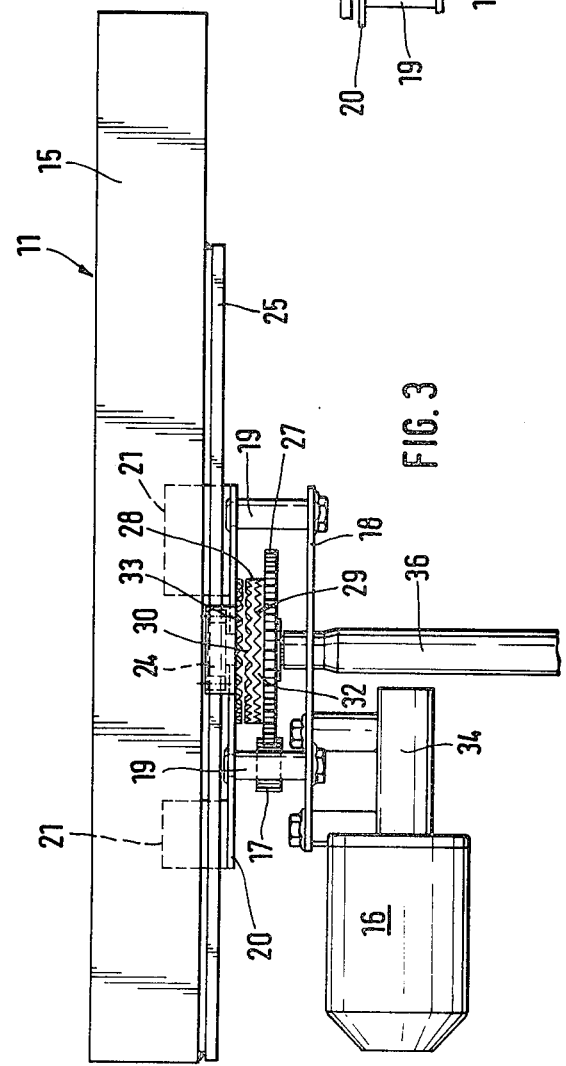

SAFETY SUPPORT FOR ADJUSTABLE VEHICLE SEATS

BACKGROUND OF THE INVENTION

This invention relates generally to adjustable vehicle seats, and more particularly it relates to a motor vehicle seat having a supporting guide rail assembly including a stationary rail secured to the floor of the vehicle, a travel rail secured to the seat and being movably coupled to the stationary rail, a longitudinal position adjuster including a motor having a driving pinion, a drive gear engaging the travel rail and a rotary shaft driven by the pinion drive supporting for joint rotation with the drive gear.

In a known adjustable seat support of the above-described kind the travel rail which is connected to the seat part is provided with a gear rack which acts as the longitudinal position adjuster for the guide rail assembly. The drive gear is in mesh with the rack and the shaft is rotatably supported in a bearing plate which in turn is rigidly secured to the stationary rail. In most conventional position adjusters, the drive gear is the last stage of a reduction gear unit which is fixedly mounted on the bearing plate. The first stage of this reduction gear assembly is the pinion of a driving motor, usually an electromotor, and the second stage is usually a worm gear. The electromotor with its pinion and the reduction gear are constructed as a compact driving unit. The worm gear is preferably made of a self-lubricating synthetic material. In the case of a collision, however, the worm gear is subject to considerable acceleration forces which may cause breakage of the meshing teeth so that the vehicle seat may be thrown forwardly or rearwardly according to the direction of the impact, and consequently the danger of injury to the user of the seat is considerably increased.

SUMMARY OF THE INVENTION

It is, therefore, a general object of the present invention to overcome the aforementioned disadvantages.

In particular, an object of the present invention is to provide an improved adjustable support for motor vehicle seats of the aforedescribed type which cannot be displaced in the forward or rearward direction in the case of excessive acceleration or deceleration forces.

Another object of this invention is to provide such an improved support which in the case of a collision securely remains in its adjusted position.

In keeping with these objects, and others which will become apparent hereafter, one feature of the invention resides, in a motor driven position adjuster in the seats of the above-described type, in a combination which comprises an intermediate drive gear supported for free rotation on the shaft of the adjuster and being in mesh with the driving pinion, a stationary arresting ring arranged on the shaft, a coupling disk supported for rotation and for axial movement on the shaft and means for axially thrusting the coupling disk into a driving position in which it is coupled to a side of the intermediate gear and alternatively into an arresting position in which it is coupled to the arresting ring. The coupling disk is shifted into its arresting position automatically by the effect of acceleration forces which act against the seat in the case of a collision and its engagement with the arresting ring brings about the advantage that such acceleration forces of the seat are intercepted via the bearing plate and/or via the stationary support rail, by the floor of the vehicle body so that the transmission gear of the motor is bypassed and subject only to the forces which are needed for the normal position adjustment of the seat. The component parts cooperating with the driving motor unit are dimensioned such as to withstand these collision forces. In this manner it is insured that the vehicle seat cannot be displaced relative to the vehicle body in the case of a collision. Moreover, the safety adjuster according to this invention is inexpensive and can be manufactured of a relatively small number of component parts which are also easy to assemble.

According to another feature of this invention, the arresting ring is formed as a ring of face teeth projecting from the bearing plate against one side of the coupling disk to cooperate with a correspondingly ring-shaped set of coupling face teeth on the one side of the disk; the other side of the disk is also provided with a similar set of face teeth directed toward a similar ring of face teeth provided on the facing side of the intermediate gear. In this manner it is insured that under normal operational conditions the longitudinal position adjustment is accomplished by engaging the teeth of the coupling disk with the corresponding teeth of the intermediate gear whereas in the case of a collision the inclined surfaces of the toothing of the intermediate gear displace the coupling disk against the biasing spring and into engagement with the arresting ring so that a positive connection between the driving shaft and the bearing plate is established. Preferably, the outer circumference of the ring-shaped toothing of the arresting ring, of the coupling disk and of the intermediate gear are spaced from the center of the shaft about the same distance and the lengths of respective teeth correspond to each other.

According to another feature of this invention, the toothing of the arresting ring and of the intermediate gear as well as the coupling teeth of the coupling disk are in the form of face teeth which enable a reliable engagement of the arresting ring on the bearing plate with the opposite set of teeth on one side of the coupling disk or alternatively which insure a reliable engagement of the other set on the coupling disk with the ring of teeth on the intermediate gear.

Still another feature of this invention resides in the provision of a cup spring disposed on the shaft between the bearing plate and the axially displaceable coupling disk for biasing the latter into engagement with the face teeth of the intermediate driving gear during the adjustment of the position of the seat. The cup spring is dimensioned such that under normal operational conditions the driving connection between the coupling disk and the intermediate gear is secured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a sectional front view of the guide rail assembly of FIG. 1 taken along the line II—II including the safety device of this invention arranged at the left-hand side of the vehicle;

FIG. 3 is a top view of a part of the guide rail assembly at one side of the vehicle seat and including the position adjuster with the arresting safety device of this invention shown in its driving position; and FIG. 4 is a top view of a cut-away part of the safety arresting device of FIG. 3 shown in its arresting position.

DESCRIPTION OF THE PREFERRED EMBODIMENTS

Figure 1:
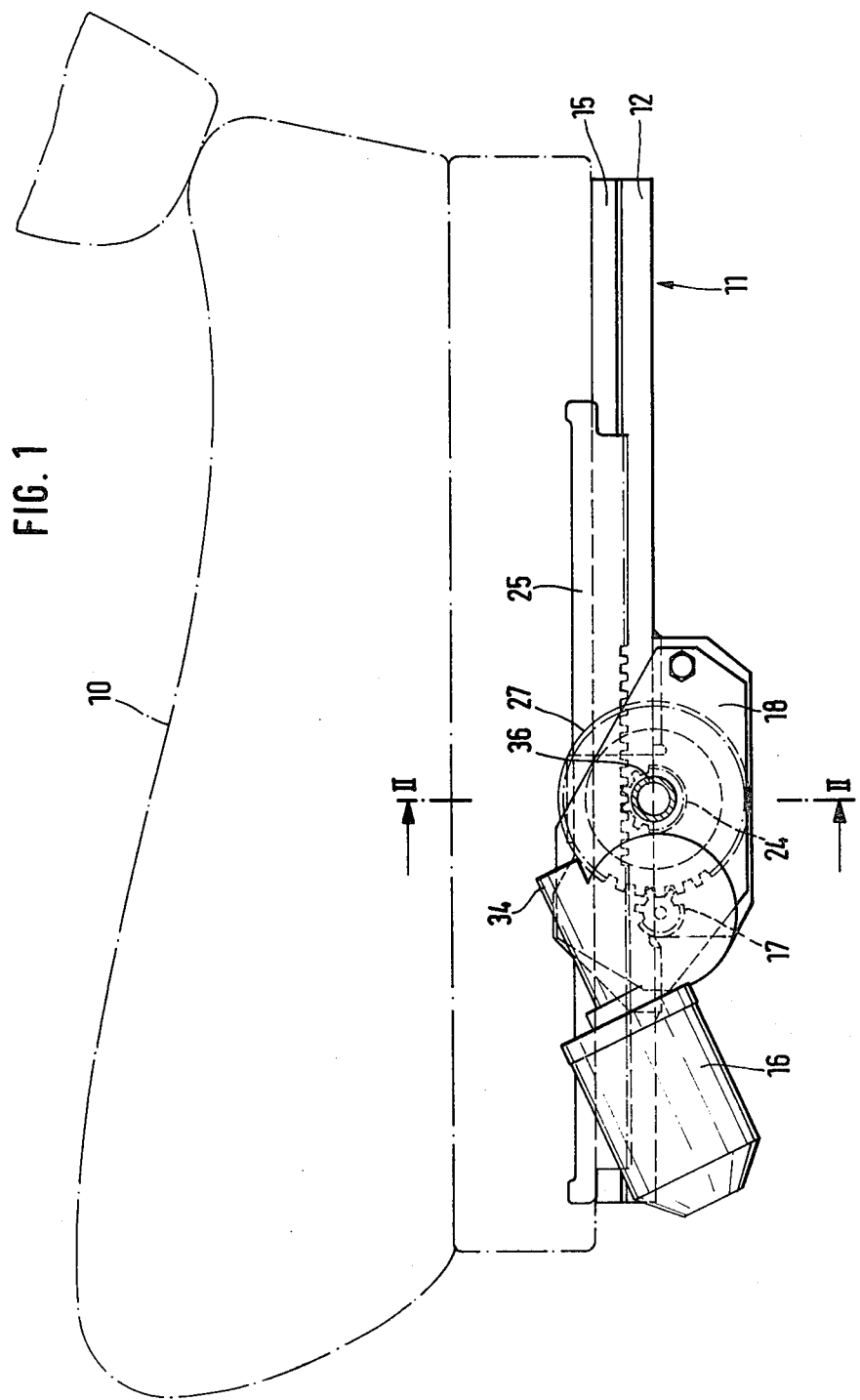
FIG. 1 is a side view of a guide rail assembly for a vehicle seat including a longitudinal position adjuster.
Figure 2A:
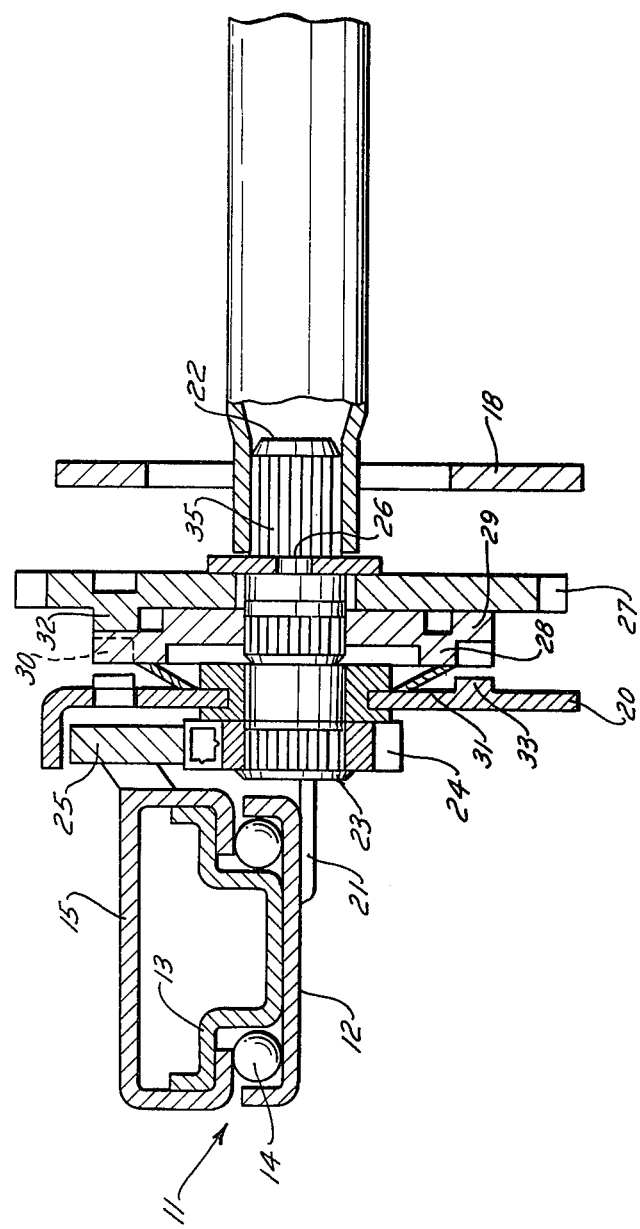
FIG. 2a is an enlarged view of the left-hand portion of FIG. 2.

Referring firstly to FIGS. 1 and 2, there is illustrated by dash-dot lines a vehicle seat 10, the bottom portions of which at each lateral side of the seat are connected to a guide rail assembly 11 which is supported on a non-illustrated floor of the vehicle. Each guide rail assembly 11 includes a profiled support rail 12 of a U-shaped cross-section, the intermediate part of which is fixedly connected to the vehicle floor and to a profiled abutment rail 13 having a hat-shaped cross-section. Two rows of bearing balls 14 are guided in the lateral channels between the support rail 12 and the abutment rail 13 and slidably support a profiled travel rail 15 of a C-shaped cross-section. The inwardly bent arms of the travel rail project into the guiding channels above the bearing balls 14 and rest on the top of the latter. The longitudinally displaceable travel rail 15 is secured to the bottom of the seat 10 whereas the support rail 12 with the abutment rail 13 are fixedly secured to the floor of the vehicle. A driving unit having a motor 16 coupled to reduction gears terminated with a driving pinion 17, is mounted on a carrier plate 18 which is rigidly attached to the stationary support rail 12. Preferably, carrier plate 18 is screwed to spacers 19 which in turn are fastened to a bearing plate 20 having angles 21 which are rigidly connected by welding, for example, to the support rail 12. Bearing plate 20 supports for rotation a shaft 22 having an outwardly projecting section 23 facing the guide rail assembly 11 and fixedly supporting a drive gear 24. A toothed rack 25 is formed on the travel rail 15 and is in mesh with the drive gear 24 so that by rotating the latter the rack together with the seat supporting travel rail 15 is displaced on balls 14 in a longitudinal direction. The shaft section 26 which extends into the interspace between the bearing plate 20 and the carrier plate 18 supports for free rotation an intermediate gear 27 which is in mesh with driving pinion 17. In addition, the shaft section 26 supports for joint rotation an axially displaceable coupling disk 28. Both faces of the coupling disk 28 are provided with oppositely directed ring-shaped toothings 29 and 30 extending preferably along the circumference of the disk. A cup spring 31 bears on bearing plate 20 and urges the coupling disk 28 against the intermediate gear 27. The face of intermediate gear 27 opposite the coupling disk 28 is also provided with a ring of toothing 32 which is engageable with the ring-shaped set of teeth 29. By the action of cup spring 31, the intermediate gear 27 is coupled to the coupling disk 28 which is axially movable in splines and rotates jointly with the shaft 22. The toothing 30 on the opposite face of coupling disk 28 faces toothing 33 on bearing plate 20. The shape of arresting teeth 33 is adapted for engaging the teeth 30 of the coupling disk. Preferably, both toothings 29 and 30 of coupling disk 28 as well as the teeth 32 on the intermediate gear and the toothing 33 on the bearing plate are in the form of rings of face teeth or wedge-shaped serations having the same diameters and substantially equal length of teeth. As seen from FIGS. 3 and 4, the toothing of the coupling disk and of the cooperating intermediate plate and of the arresting ring is the so-called Hirth-type seration.

If motor 16 having its reduction gear in the form of worm gears enclosed in housing 34 is immobile, and if in the event of a collision an excessive force acts in longitudinal direction on rack 25, so this force causes, via drive gear 24, the shaft 22 to rotate whereas the intermediate gear 27 is held in a fixed position by the immobile drive pinion 17. As a consequence the toothing 29 of coupling disk 28, which is in the driving position as indicated in FIG. 3, slides on the inclined surfaces of teeth 32 on the side of the intermediate gear 27 and axially displaces the coupling disk 28 against the cup spring 31 until the opposite toothing 30 of coupling disk 28 engages the toothing 33 of the arresting ring on bearing plate 20. By virtue of this arresting engagement the rotation of shaft 22 is prevented and rack 25 with its travel rail 15 and seat 10 are held in a fixed position. This arresting position of coupling disk 28 is illustrated in FIG. 4.

As can be seen particularly from FIG. 2, the shaft 22 has a wedge-shaped section 35 projecting from the shaft section 26. This wedge-shaped section 35 engages one end of a connection rod 36, the other end of which is connected to a corresponding wedge-shaped shaft section 35' on the opposite guide rail assembly 11. This guide rail assembly at the other lateral side of the seat 10 also has a shaft 22' cooperating with the wedge-shaped shaft section 35' and supported for rotation in bearing plate 20' to drive via drive gear 24' a corresponding rack secured to the travel rail 15. As known, the connecting rod 36 prevents any cross-swing of the seat during its longitudinal displacement.

It will be understood that each of the elements described above, or two or more together, may also find a useful application in other types of constructions differing from the types described above.

While the invention has been illustrated and described as embodied in an arresting safety device for adjusters of a guide rail assembly for motor vehicle seats, it is not intended to be limited to the details shown, since various modifications and structural changes may be made without departing in any way from the spirit of the present invention. For instance, it is possible to modify the configuration of toothings 29 and 30 as well as the serration of the toothing 32 and of the arresting ring 33. Also, instead of a cup spring 31, it is possible to employ an array of such cup springs, a spiral pressure spring and the like.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a longitudinally adjustable seat, particularly a motor vehicle seat having a guide rail assembly including a stationary rail secured to the floor of the vehicle, a travel rail secured to the seat and being movably coupled to the stationary rail, a position adjuster fixedly mounted relative to said stationary rail and including a motor assembly having a driving pinion, a rotary shaft and a drive gear supported for joint rotation on the shaft, a combination comprising an intermediate drive gear supported for free rotation on said shaft and being in mesh with said pinion; an arresting ring arranged around said shaft and being fixedly mounted relative to said stationary rail; a coupling disk supported for joint rotation and for axial movement on said shaft; and means for axially biasing the coupling disk into a driving position in which it is coupled to said intermediate gear and, alternatively, into an arresting position in which it is coupled to said arresting ring.

2. The combination as defined in claim 1, wherein said position adjuster includes a bearing plate secured to the stationary rail, said arresting ring including teeth formed on said bearing plate, said coupling disk including on each side thereof a corresponding ring of coupling teeth, and a side of said intermediate gear facing said coupling disk having a ring of wedge-shaped arresting teeth.

3. The combination as defined in claim 2, wherein the diameters of the toothings and the length of clearances between respective teeth on said coupling disk correspond to the diameters and the length of clearances of the opposite sets of teeth on said arresting ring and said intermediate gear.

4. The combination as defined in claim 2, wherein the arresting ring, said coupling disk and said intermediate gear are, respectively, in the form of interengageable face serrations.

5. The combination as defined in claim 2, wherein said means for axially urging said coupling disk includes a cup spring abutting against said bearing plate, and said intermediate gear being spaced apart from said arresting ring at such a distance that during an accidental rotation of said shaft caused by acceleration forces acting against the seat, the inclined surfaces of arresting teeth on said intermediate gear axially displace said coupling disk into engagement with said arresting ring.

* * * * *